United States Patent
Russell (10) Patent No.: US 11,386,614 B2
(45) Date of Patent: Jul. 12, 2022

(54) SHADING IMAGES IN THREE-DIMENSIONAL CONTENT SYSTEM

(71) Applicant: Google LLC, Mountain View, CA (US)

(72) Inventor: Andrew Ian Russell, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 501 days.

(21) Appl. No.: 16/009,696

(22) Filed: Jun. 15, 2018

(65) Prior Publication Data

US 2019/0385359 A1    Dec. 19, 2019

(51) Int. Cl.
 *G06T 15/80* (2011.01)
 *G06T 7/507* (2017.01)

(52) U.S. Cl.
 CPC .............. *G06T 15/80* (2013.01); *G06T 7/507* (2017.01); *G06T 2200/04* (2013.01)

(58) Field of Classification Search
 None
 See application file for complete search history.

(56) References Cited

U.S. PATENT DOCUMENTS

| | | | |
|---|---|---|---|
| 4,879,598 A * | 11/1989 | Seto | H04N 5/2173 348/164 |
| 6,437,781 B1 * | 8/2002 | Tucker | G06T 15/503 345/426 |
| 9,769,460 B1 | 9/2017 | Mukherjee et al. | |
| 9,979,947 B2 | 5/2018 | Lazarus et al. | |
| 10,607,567 B1 * | 3/2020 | Schritter | G09G 5/06 |
| 10,885,701 B1 * | 1/2021 | Patel | A63F 13/57 |

(Continued)

FOREIGN PATENT DOCUMENTS

| | | | | |
|---|---|---|---|---|
| JP | 01188176 A | * | 7/1989 | .......... H04N 5/2173 |
| WO | 2018226264 A1 | | 12/2018 | |

OTHER PUBLICATIONS

Dilger, "Apple and the furture of photography in Depth: iPhone 8 Plus", published Oct. 5, 2017, retrieved from https://appleinsider.com/articles/17/10/05/apple-and-the-future-of-photography-in-depth-iphone-8-plus Jul. 30, 2021.*

(Continued)

*Primary Examiner* — James A Thompson
(74) *Attorney, Agent, or Firm* — Brake Hughes Bellermann LLP (57) ABSTRACT

A method includes: receiving three-dimensional (3D) information generated by a first 3D system, the 3D information including images of a scene and depth data about the scene; identifying, using the depth data, first image content in the images associated with a depth value that satisfies a criterion; and generating modified 3D information by applying first shading regarding the identified first image content. The modified 3D information can be provided to a second 3D system. The scene can contain an object in the images, and generating the modified 3D information can include determining a surface normal for second image content of the object, and applying second shading regarding the second image content based on the determined surface normal. A portion of the object can have a greater depth value than another portion, and second shading can be applied regarding a portion of the images where the second portion is located.

21 Claims, 5 Drawing Sheets

(56) References Cited

U.S. PATENT DOCUMENTS

| | | | | |
|---|---|---|---|---|
| 2008/0247670 | A1* | 10/2008 | Tam | G06T 7/50 348/51 |
| 2008/0263458 | A1* | 10/2008 | Altberg | H04L 12/66 715/757 |
| 2011/0181590 | A1* | 7/2011 | Brabec | G06T 11/001 345/424 |
| 2011/0292018 | A1* | 12/2011 | Kubota | G09G 3/3426 345/211 |
| 2012/0051631 | A1* | 3/2012 | Nguyen | G06K 9/38 382/164 |
| 2014/0176663 | A1 | 6/2014 | Cutler et al. | |
| 2015/0379720 | A1* | 12/2015 | Herraez | H04N 13/261 348/43 |
| 2016/0140689 | A1* | 5/2016 | Lux | H04N 19/93 345/420 |
| 2016/0335796 | A1* | 11/2016 | Roimela | G06T 17/05 |
| 2017/0127046 | A1* | 5/2017 | Das | H04N 13/204 |
| 2017/0347055 | A1* | 11/2017 | Dore | G06T 7/90 |
| 2017/0358253 | A1 | 12/2017 | Bonnier et al. | |
| 2018/0012407 | A1* | 1/2018 | Chuang | G06T 7/0046 |
| 2018/0144547 | A1* | 5/2018 | Shakib | G06T 15/60 |

OTHER PUBLICATIONS

L. Zhang, C. Vazquez and S. Knorr, "3D-TV Content Creation: Automatic 2D-to-3D Video Conversion," in IEEE Transactions on Broadcasting, vol. 57, No. 2, pp. 372-383, Jun. 2011, doi: 10.1109/TBC.2011.2122930. (Year: 2011).*

A. Smolic et al., "Three-Dimensional Video Postproduction and Processing," in Proceedings of the IEEE, vol. 99, No. 4, pp. 607-625, Apr. 2011, doi: 10.1109/JPROC.2010.2098350. (Year: 2011).*

International Search Report and Written Opinion for Application No. PCT/US2019/036352, dated Aug. 13, 2019, 17 pages.

Caldwell, "How to Use Portrait Mode and Portrait Lighting on iPhone X / iMORE"; www.imore.com, Dec. 4, 2017, 18 pages.

* cited by examiner

SHADING IMAGES IN THREE-DIMENSIONAL CONTENT SYSTEM

TECHNICAL FIELD

This document relates, generally, to shading images in a three-dimensional system.

BACKGROUND

Developments in the fields of computer technology and communication systems have been seen as a way to fulfill the wish for efficient and natural long-distance communication. Video conferencing systems have been introduced in attempts to provide a natural person-to-person interaction between two or more people. However, they generally rely on two-dimensional (2D) images being presented on a display, which can mean the interaction is not sufficiently lifelike.

The advent of three-dimensional (3D) technology, moreover, has not resulted in a sufficient improvement over the existing 2D approaches. For example, 3D systems can require very complex hardware, such as for capturing the content to be broadcast and/or for processing the content.

SUMMARY

In a first aspect, a method includes: receiving three-dimensional (3D) information generated by a first 3D system, the 3D information including images of a scene and depth data about the scene; identifying, using the depth data, first image content in the images associated with a depth value that satisfies a criterion; and generating modified 3D information by applying first shading regarding the identified first image content.

Implementations can include any or all of the following features. The criterion includes that the first image content is beyond a predefined depth in the scene. Applying the first shading comprises causing the first image content to be rendered as black. Use of the predefined depth, and applying the first shading, comprises causing a background of the images to be rendered as black. The first shading is dependent on a depth value of the first image content. The criterion includes that the first image content is closer than a predefined depth in the scene. The scene contains an object in the images, and wherein generating the modified 3D information further comprises determining a surface normal for second image content of the object, and applying second shading regarding the second image content based on the determined surface normal. Applying the second shading comprises determining a dot product between the surface normal and a camera vector, and selecting the second shading based on the determined dot product. Applying the second shading comprises fading the second image content to black based on the second image content facing away in the images. The scene contains an object in the images and a first portion of the object has a greater depth value in the depth data than a second portion of the object, and wherein generating the modified 3D information further comprises applying second shading regarding a portion of the images where second image content corresponding to the second portion is located. Applying the second shading comprises selecting the portion of the images based on a portion of a display for presentation of the images. The object comprises a person, the first portion of the object comprises a face of the person, the second portion of the object comprises a torso of the person, and the portion of the display comprises a bottom of the display. The method further comprises identifying a hole in at least one of the images, wherein generating the modified 3D information comprises applying second shading regarding the hole. Generating the modified 3D information further comprises hiding a depth error in the 3D information. The depth data is based on infrared (IR) signals returned from the scene, and wherein generating the modified 3D information comprises applying second shading proportional to a strength of the IR signals. The method further comprises stereoscopically presenting the modified 3D information at the second 3D system, wherein the first image content has the first shading. Stereoscopically presenting the modified 3D information comprises additively rendering the images. The method further comprises providing the modified 3D information to a second 3D system.

In a second aspect, a system includes: cameras; a depth sensor; and a three-dimensional (3D) content module having a processor executing instructions stored in a memory, the instructions causing the processor to identify, using depth data included in 3D information, first image content in images of a scene included in the 3D information, the first image content identified as being associated with a depth value that satisfies a criterion, and to generate modified 3D information by applying first shading regarding the identified first image content.

Implementations can include any or all of the following features. The scene contains an object in the images, and generating the modified 3D information further comprises determining a surface normal for second image content of the object, and applying second shading regarding the second image content based on the determined surface normal. The scene contains an object in the images and a first portion of the object has a greater depth value than a second portion of the object, and generating the modified 3D information further comprises applying second shading regarding a portion of the images where second image content corresponding to the second portion is located.

BRIEF DESCRIPTION OF DRAWINGS

Like reference symbols in the various drawings indicate like elements.

DETAILED DESCRIPTION

This document describes examples relating to shading of images in a 3D system. Shading can be provided to provide a more lifelike, natural and intuitive appearance of people or other subjects on a 3D display. An artificially created lighting mode can be provided that renders a scene with a natural and intuitive appearance while providing useful technical advantages and improvements. Some implementations can address parallax problems that tend to make backgrounds in 3D images look unnatural. Some implementations can address the amount of hardware required for delivering a quality 3D experience. For example, the practice of using multiple independent 3D content pods in capturing a scene can be addressed. For example, the practice of physically blocking a portion of the 3D screen with a wall can be addressed. For example, the practice of requiring special lighting for capturing a scene in 3D format can be addressed. Some implementations can facilitate high-quality 3D telepresence. Some implementations can provide a true hang-on-the-wall formfactor for a 3D display.

Some implementation can address the amount or complexity of data processing required for delivering a quality 3D experience. For example, the scene that is to be represented in 3D can be provided with a larger capture volume. For example, the need to perform volumetric fusion in 3D data can be reduced or eliminated. For example, the processing relating to secondary aspects of a displayed scene, such as its background, can be reduced or eliminated by shading the background. For example, the amount of bandwidth needed for processing 3D information, such as for providing 3D teleconferencing, can be reduced.

Figure 1:
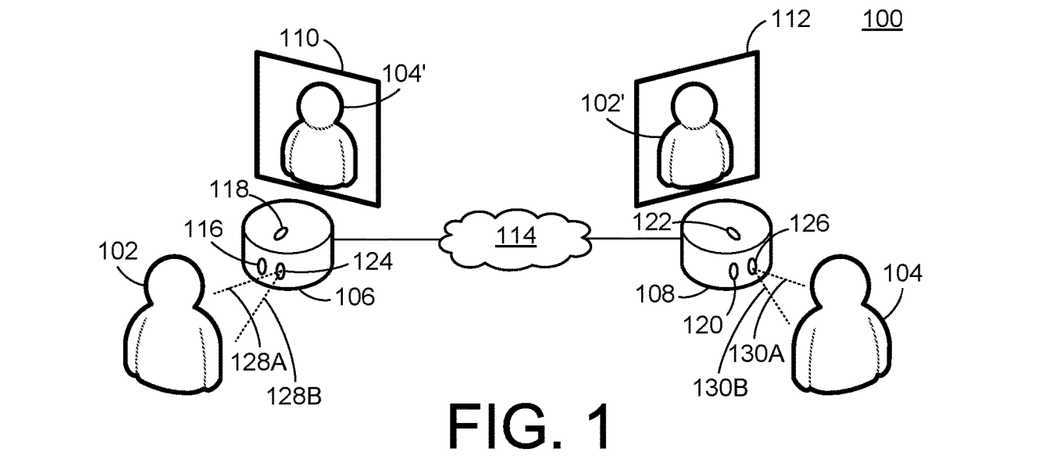
FIG. 1 shows an example of a 3D content system.

FIG. 1 shows an example of a 3D content system 100. The 3D content system 100 can be used by multiple people. Here, the 3D content system 100 is being used by a person 102 and a person 104. For example, the persons 102 and 104 are using the 3D content system 100 to engage in a 3D telepresence session. In such an example, the 3D content system 100 can allow each of the persons 102 and 104 to see a highly realistic and visually congruent representation of the other, thereby facilitating them to interact with each other similar to them being in the physical presence of each other.

Each of the persons 102 and 104 can have a corresponding 3D pod. Here, the person 102 has a pod 106 and the person 104 has a pod 108. The pods 106 and 108 can provide functionality relating to 3D content, including, but not limited to: capturing images for 3D display, processing and presenting image information, and processing and presenting audio information. The pod 106 and/or 108 can constitute a collection of sensing devices integrated as one unit. The pod 106 and/or 108 can include some or all components described with reference to FIG. 13.

The 3D content system 100 can include one or more 3D displays. Here, a 3D display 110 is provided for the pod 106, and a 3D display 112 is provided for the pod 108. The 3D display 110 and/or 112 can use any of multiple types of 3D display technology to provide a stereoscopic view for the respective viewer (here, the person 102 or 104, for example). In some implementations, the 3D display 110 and/or 112 can include a standalone unit (e.g., self-supported or suspended on a wall). In some implementations, the 3D display 110 and/or 112 can include wearable technology (e.g., a head-mounted display).

The 3D content system 100 can be connected to one or more networks. Here, a network 114 is connected to the pod 106 and to the pod 108. The network 114 can be a publicly available network (e.g., the internet), or a private network, to name just two examples. The network 114 can be wired, or wireless, or a combination of the two. The network 114 can include, or make use of, one or more other devices or systems, including, but not limited to, one or more servers (not shown).

The pod 106 and/or 108 can include multiple components relating to the capture, processing, transmission or reception of 3D information, and/or to the presentation of 3D content. The pods 106 and 108 can include one or more cameras for capturing image content for images to be included in a 3D presentation. Here, the pod 106 includes cameras 116 and 118. For example, the camera 116 and/or 118 can be disposed essentially within a housing of the pod 106, so that an objective or lens of the respective camera 116 and/or 118 captured image content by way of one or more openings in the housing. In some implementations, the camera 116 and/or 118 can be separate from the housing, such as in form of a standalone device (e.g., with a wired and/or wireless connection to the pod 106). The cameras 116 and 118 can be positioned and/or oriented so as to capture a sufficiently representative view of (here) the person 102. While the cameras 116 and 118 should preferably not obscure the view of the 3D display 110 for the person 102, the placement of the cameras 116 and 118 can generally be arbitrarily selected. For example, one of the cameras 116 and 118 can be positioned somewhere above the face of the person 102 and the other can be positioned somewhere below the face. For example, one of the cameras 116 and 118 can be positioned somewhere to the right of the face of the person 102 and the other can be positioned somewhere to the left of the face. The pod 108 can in an analogous way include cameras 120 and 122, for example.

The pod 106 and/or 108 can include one or more depth sensors to capture depth data to be used in a 3D presentation. Such depth sensors can be considered part of a depth capturing component in the 3D content system 100 to be used for characterizing the scenes captured by the pods 106 and/or 108 in order to correctly represent them on a 3D display. Also, the system can track the position and orientation of the viewer's head, so that the 3D presentation can be rendered with the appearance corresponding to the viewer's current point of view. Here, the pod 106 includes a depth sensor 124. In an analogous way, the pod 108 can include a depth sensor 126. Any of multiple types of depth sensing or depth capture can be used for generating depth data. In some implementations, an assisted-stereo depth capture is performed. The scene can be illuminated using dots of lights, and stereomatching can be performed between two respective cameras. This illumination can be done using waves of a selected wavelength or range of wavelengths. For example, infrared (IR) light can be used. Here, the depth sensor 124 operates, by way of illustration, using beams 128A and 128. The beams 128A and 128B can travel from the pod 106 toward structure or other objects (e.g., the person 102) in the scene that is being 3D captured, and/or from such structures/objects to the corresponding detector in the pod 106, as the case may be. The detected signal(s) can be processed to generate depth data corresponding to some or the entire scene. As such, the beams 128A-B can be considered as relating to the signals on which the 3D content system 100 relies in order to characterize the scene(s) for purposes of 3D representation. For example, the beams 128A-B can include IR signals. Analogously, the pod 108 can operate, by way of illustration, using beams 130A-B.

Depth data can include or be based on any information regarding a scene that reflects the distance between a depth sensor (e.g., the depth sensor 124) and an object in the scene. The depth data reflects, for content in an image corresponding to an object in the scene, the distance (or depth) to the object. For example, the spatial relationship between the camera(s) and the depth sensor can be known, and can be used for correlating the images from the camera(s) with signals from the depth sensor to generate depth data for the images.

In some implementations, depth capturing can include an approach that is based on structured light or coded light. A striped pattern of light can be distributed onto the scene at a relatively high frame rate. For example, the frame rate can be considered high when the light signals are temporally sufficiently close to each other that the scene is not expected to change in a significant way in between consecutive signals, even if people or objects are in motion. The resulting pattern(s) can be used for determining what row of the projector is implicated by the respective structures. The camera(s) can then pick up the resulting pattern and triangulation can be performed to determine the geometry of the scene in one or more regards.

The images captured by the 3D content system 100 can be processed and thereafter displayed as a 3D presentation. Here, 3D image 104' is presented on the 3D display 110. As such, the person 102 can perceive the 3D image 104' as a 3D representation of the person 104, who may be remotely located from the person 102. 3D image 102' is presented on the 3D display 112. As such, the person 104 can perceive the 3D image 102' as a 3D representation of the person 102. Examples of 3D information processing are described below.

The 3D content system 100 can allow participants (e.g., the persons 102 and 104) to engage in audio communication with each other and/or others. In some implementations, the pod 106 includes a speaker and microphone (not shown). For example, the pod 108 can similarly include a speaker and a microphone. As such, the 3D content system 100 can allow the persons 102 and 104 to engage in a 3D telepresence session with each other and/or others.

Figure 2:
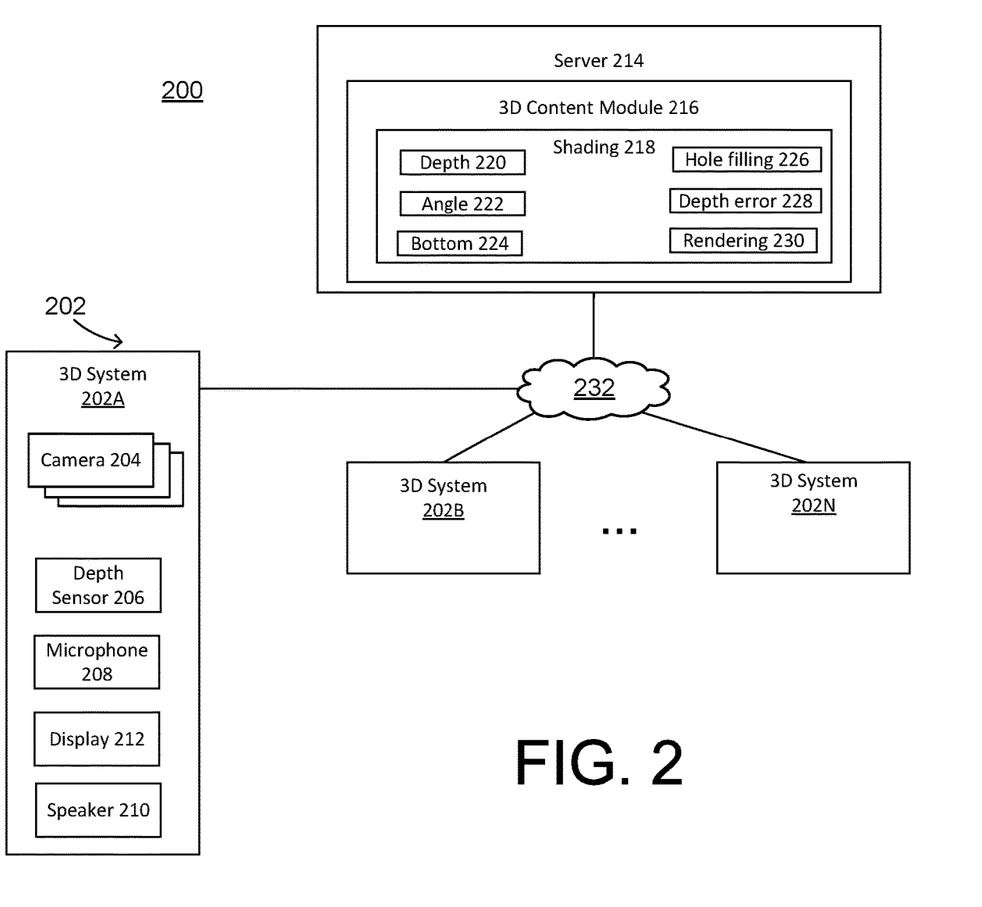
FIG. 2 shows an example of a 3D content system.

FIG. 2 shows an example of a 3D content system 200. The 3D content system 200 can serve as or be included within one or more implementations described herein, and/or can be used to perform the operation(s) of one or more examples of 3D processing or presentation described herein. The overall 3D content system 200 and/or one or more of its individual components, can be implemented according to one or more examples described below with reference to FIG. 13.

The 3D content system 200 includes one or more 3D systems 202. Here, 3D systems 202A, 202B through 202N are shown, where the index N indicates an arbitrary number. The 3D system 202 can provide for capturing of visual and audio information for a 3D presentation, and forward the 3D information for processing. Such 3D information can include images of a scene, depth data about the scene, and audio from the scene, to name just a few examples. For example, the 3D system 202 can serve as, or be included within, the pod 106 and 3D display 110 (FIG. 1).

The 3D content system 200 includes multiple cameras 204. Any type of light-sensing technology can be used for capturing images, such as the types of images sensors used in common digital cameras. The cameras 204 can be of the same type or different types.

The 3D content system 200 includes a depth sensor 206. In some implementations, the depth sensor 206 operates by way of propagating IR signals onto the scene and detecting the responding signals. For example, the depth sensor 206 can generate and/or detect the beams 128A-B.

The 3D content system 200 includes at least one microphone 208 and a speaker 210. For example, these can be integrated into a head-mounted display worn by the user.

The 3D content system 200 includes a 3D display 212 that can present 3D images in a stereoscopic fashion. In some implementations, the 3D display 212 can be a standalone display and in some other implementations the 3D display 212 can be included in a head-mounted display unit configured to be work by a user to experience a 3D presentation. Such implementations can operate in accordance with examples described with reference to FIG. 13.

In some implementations, the 3D display 212 operates using parallax barrier technology. For example, a parallax barrier can include parallel vertical stripes of an essentially non-transparent material (e.g., an opaque film) that are placed between the screen and the viewer. Because of the parallax between the respective eyes of the viewer, different portions of the screen (e.g., different pixels) are viewed by the respective left and right eyes.

In some implementations, the 3D display 212 operates using lenticular lenses. For example, alternating rows of lenses can be placed in front of the screen, the rows aiming light from the screen toward the viewer's left and right eyes, respectively.

In some implementations, the 3D display 212 can include a head-mounted display (e.g., as described with reference to FIG. 13). For example, the head-mounted display can use different displays for, or different parts of a display directed toward, the respective eyes, thereby providing a stereoscopic view of 3D images.

The 3D content system 200 can include a server 214 that can perform certain tasks of data processing, coordination and/or data transmission. The server 214 and/or components thereof can include some or all components described with reference to FIG. 13.

The server 214 includes a 3D content module 216 that can be responsible for handling 3D information in one or more ways. This can include receiving 3D content (e.g., from the 3D system 202A), processing the 3D content and/or forwarding the (processed) 3D content to another participant (e.g., to another of the 3D systems 202).

Some aspects of the functions performed by the 3D content module 216 can be implemented for performance by a shading module 218. The shading module 218 can be responsible for applying shading regarding certain portions of images (e.g., to cause a background to be rendered as black), and also performing other services relating to images that have been, or are to be, provided with shading. For example, the shading module 218 can be utilized to counteract or hide some artifacts that may otherwise be generated by the 3D system(s) 202.

Shading refers to one or more parameters that define the appearance of image content, including, but not limited to, the color of an object, surface, and/or a polygon in the image. In some implementations, shading can be applied to, or adjusted for, one or more portions of image content to change how those image content portion(s) will appear to a viewer. For example, shading can be applied/adjusted in order to make the image content portion(s) darker or black.

The shading module 218 can include a depth processing component 220. In some implementations, the depth processing component 220 can apply shading to image content based on one or more depth values associated with that content. For example, shading can be applied to all content having depth values beyond a predetermined depth. This can allow the depth processing component 220 to cause essentially an entire background (e.g., the scene behind the person 102 (FIG. 1) to be rendered as black, to name one example.

The shading module 218 can include an angle processing component 222. In some implementations, the angle processing component 222 can apply shading to image content based on that content's orientation (e.g., angle) with respect to the camera capturing the image content. For example, shading can be applied to content that faces away from the camera angle by more than a predetermined degree. This can allow the angle processing component 222 to cause brightness to be reduced and faded out as a surface turns away from the camera, to name just one example.

The shading module 218 can include a bottom processing component 224. In some implementations, the bottom processing component 224 can apply shading to image content based on that content's placement on the 3D display. For example, shading can be applied to content toward the bottom of the 3D display (hence the name bottom). This can allow the bottom processing component 224 to fade out, say, the lower torso of a person (e.g., the person 102 in FIG. 1) before the bottom end of the 3D display, to name just one example. Shading can also or instead be performed toward any other portion of the 3D display, such as toward the top, the right side, and/or the left side.

The shading module 218 can include a hole filling component 226. In some implementations, the hole filling component 226 can detect and apply shading to one or more holes in the image content to give a better 3D experience. Shading can be applied where image content is missing. A hole can exist in an image because image content is absent or does not exist in a part of the image. When images representing different views of a scene are stitched together the resulting image may have one or more holes where neither of the cameras has captured image content. As such, the hole filling component 226 can compensate for holes that occur because the cameras did not have sufficient views of the subject, to name just one example.

The shading module 218 can include a depth error component 228. In some implementations, the depth error component 228 can detect and apply shading to one or more areas of the image content where depth information is insufficient or missing. For example, shading can be applied to image content having poor IR reflectance. This can allow the depth error component 228 to compensate for shiny objects in the scene, to name just one example.

The shading module 218 can include a rendering component 230. In some implementations, the rendering component 230 can cause image content to be additively rendered on the 3D display. This can allow the rendering component 230 to avoid anomalous renderings where some image information is missing, to name just one example.

The exemplary components above are here described as being implemented in the server 214, which can communicate with one or more of the 3D systems 202 by way of a network 232 (which can be similar or identical to the network 114 in FIG. 1). In some implementations, the 3D content module 216, the shading module 218 and/or the components thereof, can instead or in addition be implemented in some or all of the 3D systems 202. For example, the above-described processing can be performed by the system that originates the 3D information before forwarding the 3D information to one or more receiving systems. As another example, an originating system can forward images, depth data and/or corresponding information to one or more receiving systems, which can perform the above-described processing. Combinations of these approaches can be used.

As such, the 3D content system 200 is an example of a system that includes cameras (e.g., the cameras 204); a depth sensor (e.g., the depth sensor 206); and a 3D content module (e.g., the 3D content module 216) having a processor executing instructions stored in a memory. Such instructions can cause the processor to identify, using depth data included in 3D information (e.g., by way of the depth processing component 220), first image content in images of a scene included in the 3D information. The first image content can be identified as being associated with a depth value that satisfies a criterion. The processor can generate modified 3D information by applying first shading regarding the identified first image content.

As such, the 3D content system 200 is an example of a system that includes cameras (e.g., the cameras 204); a depth sensor (e.g., the depth sensor 206); and a 3D content module (e.g., the 3D content module 216) having a processor executing instructions stored in a memory (e.g., the angle processing component 222), the memory having stored therein 3D information including images and depth data of a scene, the images including an object, the instructions causing the processor to determine a surface normal for first image content of the object, and to generate modified 3D information by applying first shading regarding the first image content based on the determined surface normal.

As such, the 3D content system 200 is an example of a system that includes cameras (e.g., the cameras 204); a depth sensor (e.g., the depth sensor 206); and a 3D content module (e.g., the 3D content module 216) having a processor executing instructions stored in a memory (e.g., the bottom processing component 224), the memory having stored therein 3D information including images and depth data of a scene, the images including an object, wherein a first portion of the object has a greater depth value than a second portion of the object, the instructions causing the processor to generate modified 3D information by applying first shading regarding a portion of the images where first image content corresponding to the first portion is located.

Figure 3:
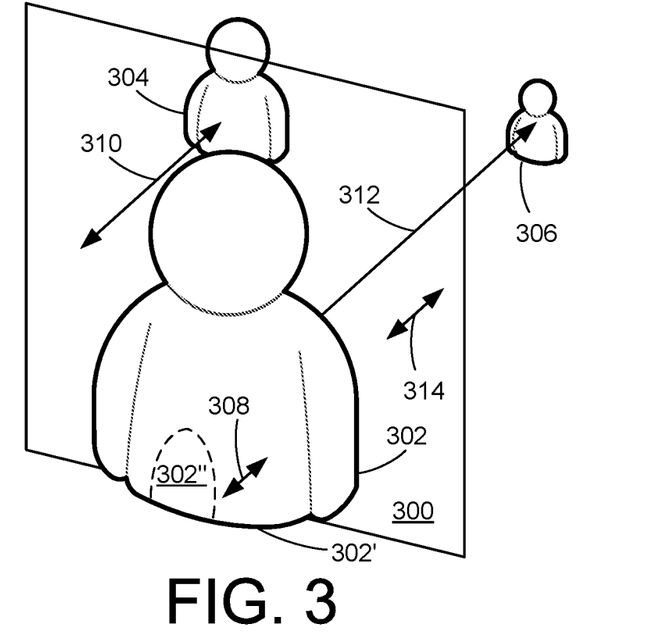
FIG. 3 shows an example of shading based on depth.

FIG. 3 shows an example of shading based on depth. This example involves images captured of a scene which are being used to make a 3D presentation on a 3D display. Here, a plane 300 of the 3D display is indicated. Persons 302, 304 and 306 in the scene are also indicated for purposes of explaining how the image content representing the scene can be processed in order to make the 3D presentation in the plane 300 of the 3D display. The persons 302-306 can be any other type of object or structure in another example.

Here, a portion 302' of the torso of the person 302 is seen to be closer to a viewer than the plane 300 of the 3D display. The 3D image is here rendered so that the viewer perceives the portion 302' to be in front of the plane 300. For example, a portion 302" of the torso of the person 302 can be said to have a depth value 308 (depth values are here schematically indicated as arrows) relative to the plane 300. The person 304, moreover, can be said to have (at least one) depth value 310 relative to the plane 300. Strictly speaking, various parts of the person 304 have different depth values relative to the plane 300, but only the depth value 310 is shown here for simplicity. Finally, the person 306 can in a similarly simplified sense be considered as having (at least) a depth value 312 relative to the plane 300. The person 302 can here be said to be at the forefront of the scene depicted on the 3D display, and the persons 304 and 306 can be said to be in the background thereof. Image content in the background can be processed differently in a 3D presentation, which will be described in examples below.

To make a quality 3D presentation, the parallax based on the viewer's current position is taken into account. As such, the rendering of the 3D images changes based on whether the viewer moves his or her head to the left or right, or up or down, to name just a few examples. However, the head-tracking technology may not represent the position of the viewer's eyes perfectly, but rather as an approximation. Also, some latency can be introduced as certain calculations are made before the 3D presentation can be updated. Some existing systems have therefore been associated with what can be referred to as "swimminess" in the background or a shakiness in the perceived location. For example, while a viewer who moves relative to the 3D display may expect the background to remain relative fixed, due to the above imperfect head-tracking and/or the latency the viewer may instead see movement in the background. This can be somewhat distracting to the viewer and their experience of the 3D presentation can suffer as a result.

These and/or other shortcomings can be addressed, for example using the depth processing component 220 (FIG. 2). In some implementations, a threshold value 314 is defined (e.g., a predefined depth) for applying shading. Image content corresponding to objects exceeding the threshold value can be shaded in one or more ways. The depth can be measured in either or both directions with regard to the plane 300. Applying the shading can involve rendering everything located beyond the threshold value 314 as black, to name one example. As such, the parts of the scene that are behind the person 302 from the viewer's perspective, including the persons 304 and 306, can be rendered black.

In some implementations, different shadings can be applied based on the respective depth values. For example, the person 304 having the depth value 310 can be provided with a different shading (e.g., darker shading or black shading) than the person 306 having the depth value 312. As such, the shading of a given image content can be dependent on the depth value associated with that image content. This can address the "swimminess" situation in a way that creates a natural appearance of the scene in the 3D image, akin to, say, if the person 302 were illuminated by a bright spotlight that left the rest of the scene dark or shadowed.

Figure 4:
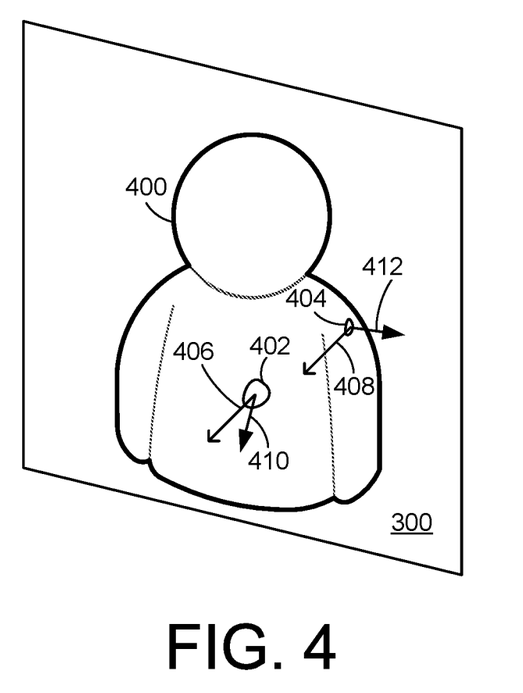
FIG. 4 shows an example of shading based on surface orientation.

FIG. 4 shows an example of shading based on surface orientation. Here, a person 400 is presented in relation to the plane 300 of the 3D display. In another example, any other object or structure than a person can instead or additionally be involved. Some portions of the image of the person 400 will be discussed as examples. Here, the person 400 includes an image portion 402 (e.g., on the front of the torso of the person 400) and an image portion 404 (e.g., on the shoulder of the person 400). Each image portion of the person 400, including the image portions 402 and 404, is associated with a direction from where the capturing camera received the light that came to form the respective image portions. Assuming that the image of the person 400 is captured by a single camera, the image portion 402 can be said to be associated with a camera vector 406 and the image portion 404 can be said to be associated with a camera vector 408, the camera vectors 406 and 408 being directed toward the same point in space (i.e., towards the light sensor of the camera.

Each image portion of the person 400, including the image portions 402 and 404, is associated with a surface normal which is perpendicular to the plane of the surface at that image portion. The image portion 402 can be said to be associated with a surface normal 410 and the image portion 404 can be said to be associated with a surface normal 412. Here, the surface normals 410 and 412 indicate that the image portion 404 faces away from the camera more than what the image portion 402 does.

Shading can be applied to an image portion based on the surface normal of that image portion. In some implementations, a dot product can be evaluated. The shading can be added in the texture (e.g., in an RGB texture) by modifying one or more values. For example, if the dot product of the camera vector 408 and the surface normal 412 is (close to) zero, then the image portion 404 can be rendered (essential) as black. For example, if the dot product of the camera vector 406 and the surface normal 410 is (close to) one, then the image portion 402 can be rendered with (essentially) no fading. As such, in some implementations image portions can be faded to a greater extent the more they face away from the direction of the camera. This can create the lighting effect that an object becomes gradually less bright (e.g., is shaded more toward black) at its periphery (e.g., toward the silhouette of a person). In some implementations, the angle processing component 222 (FIG. 2) can perform these operations. The application of shading can be based on a threshold (e.g., shade only if the dot product is below a certain value) or it can be progressive (e.g., shade more the lower the dot product is). This can simplify the data processing and can reduce the need to have many cameras to capture different perspectives. This lighting protocol can create natural impression for the viewer, for example when the background is rendered in a particular shading (e.g., as black).

Figure 5:
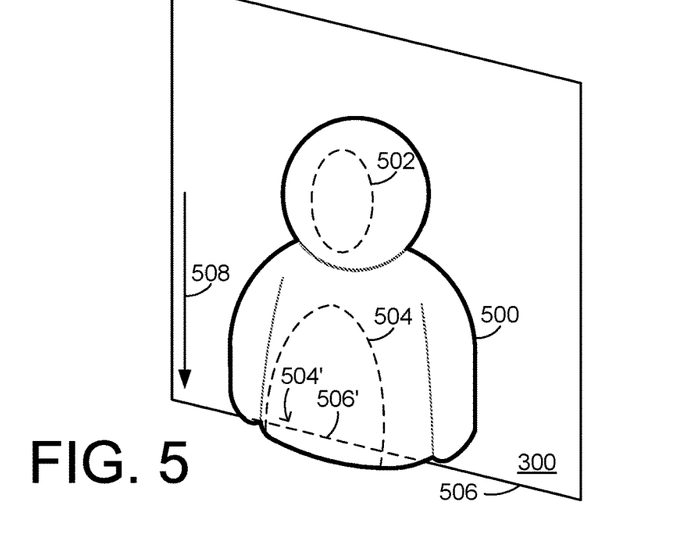
FIG. 5 shows an example of shading based on display position.

FIG. 5 shows an example of shading based on display position. It has been mentioned in other examples that image portions can be associated with depth values based on where in the scene the corresponding object (or part of the object) is located. The 3D presentation can then give the viewer the impression of depth based on such depth values. In some situations, however, unintuitive or seemingly paradoxal effects can result.

Here, a person 500 is shown relative to the plane 300 of the 3D display. The 3D presentation may be performed in such a way that a face 502 of the person 500 (here schematically illustrated as an oval) lies in the plane 300 of the 3D display. That is, the viewer looking at the 3D presentation will see the face 502 at the depth of the plane 300, which corresponds to the physical surface of the 3D display (e.g., approximately where the light-emitting elements are in certain types of display technology). Some other portion of the scene may, however, be positioned at a lesser depth than the face 502. Here, a portion 504 of the torso of the person 500 is positioned further forward (i.e., closer toward the viewer) than both the face 502 and the plane 300 of the 3D display.

The 3D presentation of the person 500 is however limited by the size of the 3D display. As such, a lower edge 506 of the 3D display will serve as the lower boundary of all image content in the 3D presentation. Particularly, a portion 506' of the lower edge 506 effectively cuts off the lowermost region of the portion 504 of the torso of the person 500 so that only the regions of the portion 504 that are above the portion 506' are visible. The problem arises because the portion 506' by definition is situated in the plane 300 of the 3D display, and a lowermost region 504' of the portion 504 is situated in front of the plane 300. That is, the lowermost region 504' is being blocked by the portion 506' although the portion 506' appears as if it is behind the lowermost region 504' in the 3D display. This can be visually unintuitive and therefore distracting to the viewer. In some existing approaches, a physical wall has been placed between the viewer and the 3D display to counteract this problem.

Shading can be applied to image content in one or more portions of the 3D image. This can be done by the bottom processing component 224, for example. In some implementations, shading can be applied according to a direction 508. For example, the 3D image of the person 500 can be faded (e.g., toward black) toward the bottom of the 3D display. This can address the above-described problem in that the lowermost region 504' may no longer be visible and no contradiction appears to the viewer between the lowermost region 504' and the portion 506' of the lower edge 506. As such, some approaches can provide a quality 3D experience without a physical wall blocking portions of the 3D display. The 3D display can therefore be implemented with a hang-on-the-wall formfactor.

Figure 6A:
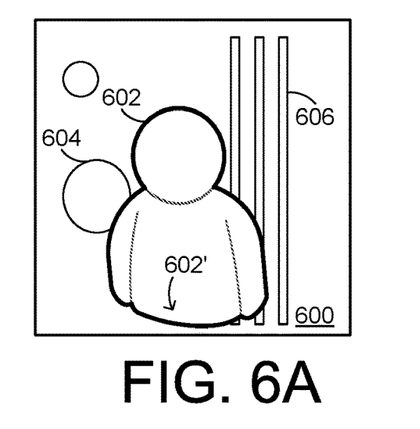
FIGS. 6A-B show an example of shading a background of a 3D image.

FIGS. 6A-B show an example of shading a background of a 3D image 600. Here, the scene as shown in FIG. 6A includes a person 602 (in the foreground) having a lower torso region 602', and objects 604 and 606 (in the background). Processing of the captured image(s) can be performed so that the 3D presentation is visually pleasing and free of anomalies. For example, such processing can be done by the 3D content module 216 in FIG. 2 (e.g., by the shading module 218 thereof).

Figure 6B:
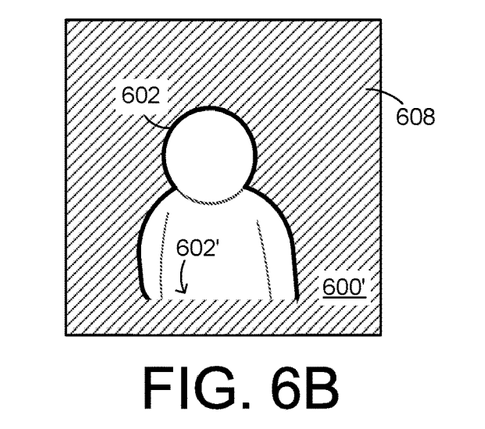

FIG. 6B shows an example of a 3D image 600' that can be presented after processing of the 3D image 600 in FIG. 6A. The 3D image 600' shows the person 602 against a background 608 that can be based on applied shading. For example, the background 608 can be rendered as black, leaving only the person 602 (and not the objects 604 and 606) visible in the 3D image 600'. In particular, the lower torso region 602' has here been faded to avoid inconsistencies with the edges of the 3D image 600'. This result can be visually consistent to the viewer, for example in that the impression can be given that the person 602 is appearing in spotlight illumination, whereas certain areas (e.g., the background and the bottom of the torso) are not covered by the spotlight and therefore appear as black.

The present example and other descriptions herein sometime refer to an operation as adding a particular shading to image content as part of processing 3D information. To add shading to image content can mean to change one or more shading values of the image content. In some situations, to add shading can involve modifying a texture to have a different shading value (e.g., to make the texture appear black). In other situations, existing image content that is to be modified (e.g., to make the image content black) can be removed from the image and be replaced by content having the desired characteristic (e.g., non-black content such as a background can be replaced with black content in order to hide the background).

The processing that generates the 3D image 600' based on the 3D image 600 can provide other advantages. In existing systems for providing 3D presentations where multiple systems of cameras has been applied, volumetric fusion has been performed to generate a visually consistent scene that can be rendered on a 3D display. The volumetric fusion has served to logically fuse the image contents from multiple 3D systems into a coherent unit, which has required the definition of a fusion volume within which objects and structures should be confined in order to be rendered in the 3D image. As such, the capture volume of the cameras (of multiple 3D systems) have generally needed to be confined to the fusion volume. This may have caused the effect that if someone, say, extended their arm outside the fusion volume, the arm may have "disappeared" in the 3D rendering because it went outside the capture volume.

When anomalies and other complexities in the image content of the 3D presentation are addressed according to one or more of the examples described herein, this can also reduce or eliminate the need to perform volumetric fusion. For example, only one pod (e.g., the pod 106 in FIG. 1) may be needed for capturing image content and depth data to generate a quality 3D presentation. The spatial locations and/or orientations of the cameras of that pod can all be known with certainty (e.g., because the cameras are fixed within a housing) and so there may be no need to perform the complex operations of volumetric fusion in order to properly render the 3D images. As such, the capture volume need no longer conform to any fusion volume and can therefore be larger than before. One advantageous result is that a person's arm that is being extended may no longer "disappear" from view and perhaps cause a hole to appear in the image. For example, the arm may instead be rendered as dark or black, which can appear natural if the rest of the person is rendered as if illuminated by a spotlight.

Figure 7:
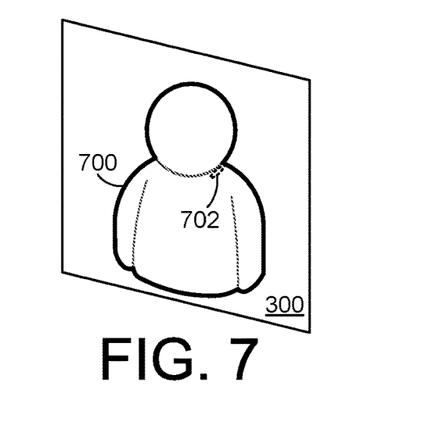
FIG. 7 shows an example of hole-filling in a 3D image.

FIG. 7 shows an example of hole-filling in a 3D image. When the cameras captures the images of a person 700 for a 3D presentation, at least one hole 702 can result. Holes can appear in various parts of an image, but may generally be more common in areas that are more difficult for the cameras to "see," such as in crevices, folds and in an open mouth, to name a few examples. The hole 702 is here located between the head and shoulder of the person 700.

When the 3D image is being rendered to a viewer, the hole 702 can give rise to an anomalous result. For example, image content that is spatially behind the hole 702, such as part of the background in the scene, can instead appear in the place of the hole 702. The hole 702 can be the result of not having enough coverage in the capture of the scene. In existing systems, this sometimes leads to the use of a larger number of cameras.

Processing of 3D information can be performed, such as by the hole filling component 226 in FIG. 2) to address the above or other situations. In some implementations, the hole 702 can be provided with shading. For example, the hole 702 can be rendered as black in the 3D image. This can provide a quality 3D experience for the viewer, for example in that it may appear as if the (now-darkened) area of the hole 702 is merely shadowed (e.g., hidden in darkness) due to some relatively intense spotlight illumination of the person 700. As such, the problem of spatially rearward content (e.g., background) unintentionally appearing through the hole 702 can be eliminated. As another example, the need to introduce more cameras to provide better coverage of a 3D scene can be reduced or eliminated.

Figure 8:
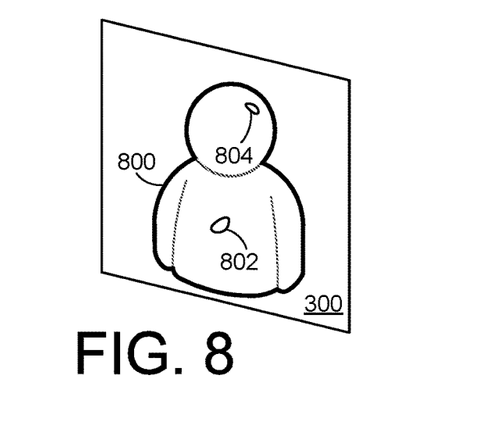
FIG. 8 shows an example of correcting depth error in a 3D image.

FIG. 8 shows an example of correcting depth error in a 3D image. The 3D image includes a person 800 shown in reference to the plane 300 of the 3D display. The depth capture within a scene for a 3D presentation can make use of technology such as the depth sensor 206 (FIG. 2), which can operate by way of IR signals (e.g., the beams 128A-B in FIG. 1). The depth sensing can be based on the ability to reflect IR waves off the surfaces of objects in the scene and detect the returning signals. Different materials can have different reflectivity for IR signals. Some materials can have a relatively good reflectance for IR signals and the depth capture for them may be straightforward. Here, a portion 802 (e.g., on the clothing of the person 800) has relatively good IR reflectivity. Other materials, however, can have poor reflectivity for IR signals. Hair, shiny metal and leather are just a few examples. As a result, such materials may provide only a poor (or no) depth data. As such, the confidence in the validity of the determined depth value(s) may be low (or no result may be obtained). Here, a portion 804 (e.g., on the hair of the person 800) can have relatively poor IR reflectivity.

3D information can be processed to address these and/or other situations. For example, depth errors can be hidden through operations performed by the depth error component 228 (FIG. 2). In some implementations, shading can be applied based on a strength of the returned IR signal. For example, a weighting of the shading can be caused to drop off until zero for areas with poor IR reflectivity. In some implementations, shading can be applied based on the confidence in the determined depth value. For example, areas with poor (or no) depth values can be rendered as black. As another example, areas with poor (or no) depth values can be rendered transparent. Here, the portion 804 can be rendered as black/transparent. The portion 802, by contrast, can be rendered in accordance with the captured image information.

Figure 9A:
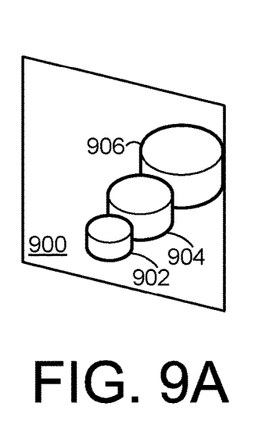
FIGS. 9A-B show an example of additively rendering a 3D image.
Figure 9B:
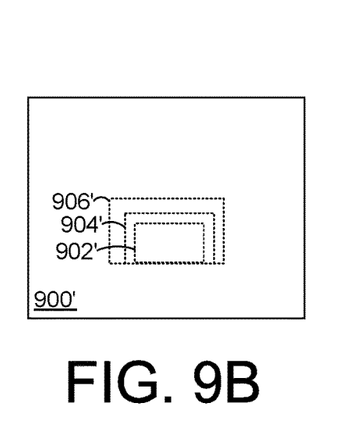

FIGS. 9A-B show an example of additively rendering a 3D image 900. In some situations, image content captured from a scene can have characteristics that present challenges in generating a quality 3D presentation, as has also been illustrated in other examples herein. For example, if a particular structure in the scene is not sufficiently illuminated or is otherwise not fully captured by the camera(s), the result can be that only little or no geometry can be determined for that structure. This means that the 3D system may not have a meaningful way of determining what is present at that location, which in turn raises the question of how content should be rendered in such a situation. For example, if only the rearward content be rendered—that is, the structure that is positioned behind the missing feature—this may be unintuitive to the viewer and as a result not provide a natural appearance.

Here, the 3D image 900 in FIG. 9A includes an object 902 which is positioned in front of an object 904, which in turn is positioned in front of an object 906. The 3D image 900 is schematically illustrated in a perspective view for clarity of the spatial arrangement. Assume, for example, that image content corresponding to the object 902 is partially missing. This situation can be addressed in an advantageous way by additively rendering the objects 902-906. For example, this can be done by way of processing performed by the rendering component 230 (FIG. 2).

FIG. 9B shows a 3D image 900' rendered based on the 3D image 900. The 3D image 900' is here shown in a plan view for purpose of illustration. The 3D image 900' includes an object 902' positioned in front of an object 904' positioned in front of an object 906'. The objects 902', 904' and 906' are rendered additively. That is, the (available) image content of the objects 902-906 (FIG. 9A) have been added to each other in generating the 3D image 900'. As such, occlusions are not accounted for in rendering the 3D image 900'. Rather depth values can be ignored. Also, the rendering of the objects 902', 904' and 906' can be done in any order. The appearance of the 3D image 900' can be more appealing to a viewer. For example, the viewer may simply accept the fact that objects appear transparently.

Some examples described herein can be combined. In some implementations, two or more of the approaches described herein with reference to FIGS. 3, 4, 5, 6A, 6B, 7, 8, 9A and/or 9B can be combined. For example, shading based on depth (e.g., as described with regard to FIG. 3) can be combined with shading based on surface orientation (e.g., as described with regard to FIG. 4). For example, shading based on depth (e.g., as described with regard to FIG. 3) can be combined with shading based on display position (e.g., as described with regard to FIG. 5). For example, shading based on surface orientation (e.g., as described with regard to FIG. 4) can be combined with shading based on display position (e.g., as described with regard to FIG. 5). For example, hole-filling (e.g., as described with regard to FIG. 7) can be combined with shading based on depth, with shading based on surface orientation, and/or with shading based on display position. For example, correcting depth error (e.g., as described with regard to FIG. 8) can be combined with shading based on depth, with shading based on surface orientation, and/or with shading based on display position. For example, additive rendering (e.g., as described with regard to FIGS. 9A-B) can be combined with shading based on depth, with shading based on surface orientation, and/or with shading based on display position.

Figure 10:
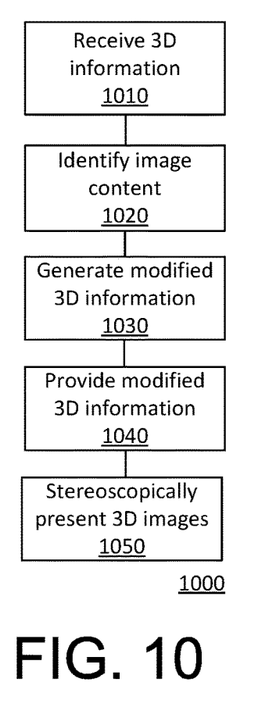
FIGS. 10-12 show examples of methods.
Figure 11:
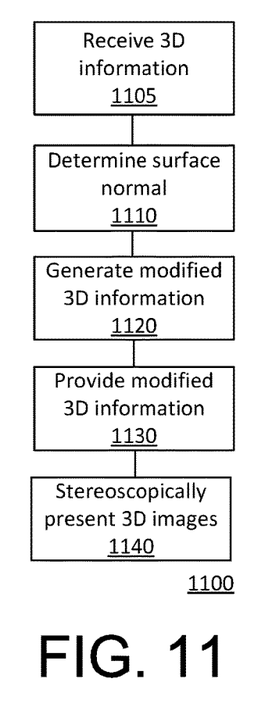
Figure 12:
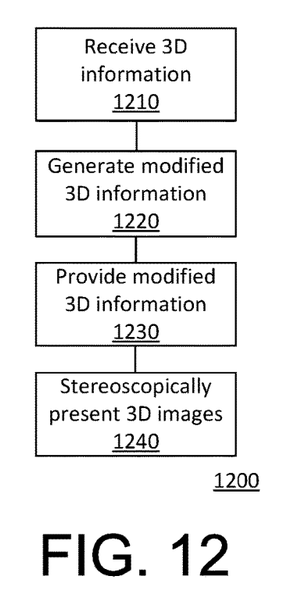

FIGS. 10-12 show examples of methods 1000, 1100 and 1200, respectively. The methods 1000, 1100 and/or 1200 can be performed by way of a processor executing instructions stored in a non-transitory storage medium. For example, some or all of the components described with reference to FIG. 13 can be used. More or fewer operations than shown can be performed. Two or more of the operations can be performed in a different order. In the following, some features from other figures herein are referred to as illustrative examples.

Beginning with the method 1000, at 1010 3D information can be received. For example, the 3D content module 216 can receive images and depth data from the pod 106.

At 1020, image content can be identified. In some implementations, image content is identified as being associated with a depth value that satisfies a criterion. For example, the depth sensor 124 can indicate that the objects 604 and 606 are in the background.

At 1030, modified 3D information can be generated. In some implementations, the shading module 218 can apply one or more modules to modify 3D information. For example, the modified 3D information can correspond to the image 600', in which the background and part of the person 602 have been provided with shading to be rendered as black or dark.

At 1040, the modified 3D information can be provided to one or more other systems or entities. For example, the server 214 or the 3D system 202A can provide the modified 3D information to the 3D system 202B.

At 1050, 3D images can be stereoscopically presented based on the modified 3D information. In some implementations, the pod 108 can make a 3D presentation in which the person in the 3D image 102' appears as if illuminated by spotlight against a black background. For example, this can be done as part of a 3D telepresence session in which the persons 102 and 104 participate.

Turning now to the method 1100, at 1105 3D information can be received. For example, this can be done in analogy with the corresponding operation in the method 1000.

At 1110, a surface normal can be determined. For example, the shading module 218 can determine the surface normal 410 and/or 412.

At 1120, modified 3D information can be generated by applying shading to image content based on the determined surface normal. For example, the image portion 404 can be shaded so as to be rendered as black.

At 1130, the modified 3D information can be provided, and at 1140 3D images can be stereoscopically presented. For example, this can be done in analogy with the corresponding operations in the method 1000.

Finally in the method 1200, at 1210 3D information can be received. For example, this can be done in analogy with the corresponding operation in the method 1000.

At 1220, modified 3D information can be generated by applying shading to a portion of an image where image content corresponding to a certain portion is located. In some implementations, this can involve shading toward a particular side or area of the 3D display. For example, shading can be applied so that image content fades out toward the bottom of the 3D display.

At 1230, the modified 3D information can be provided, and at 1240 3D images can be stereoscopically presented. For example, this can be done in analogy with the corresponding operations in the method 1000.

Figure 13:
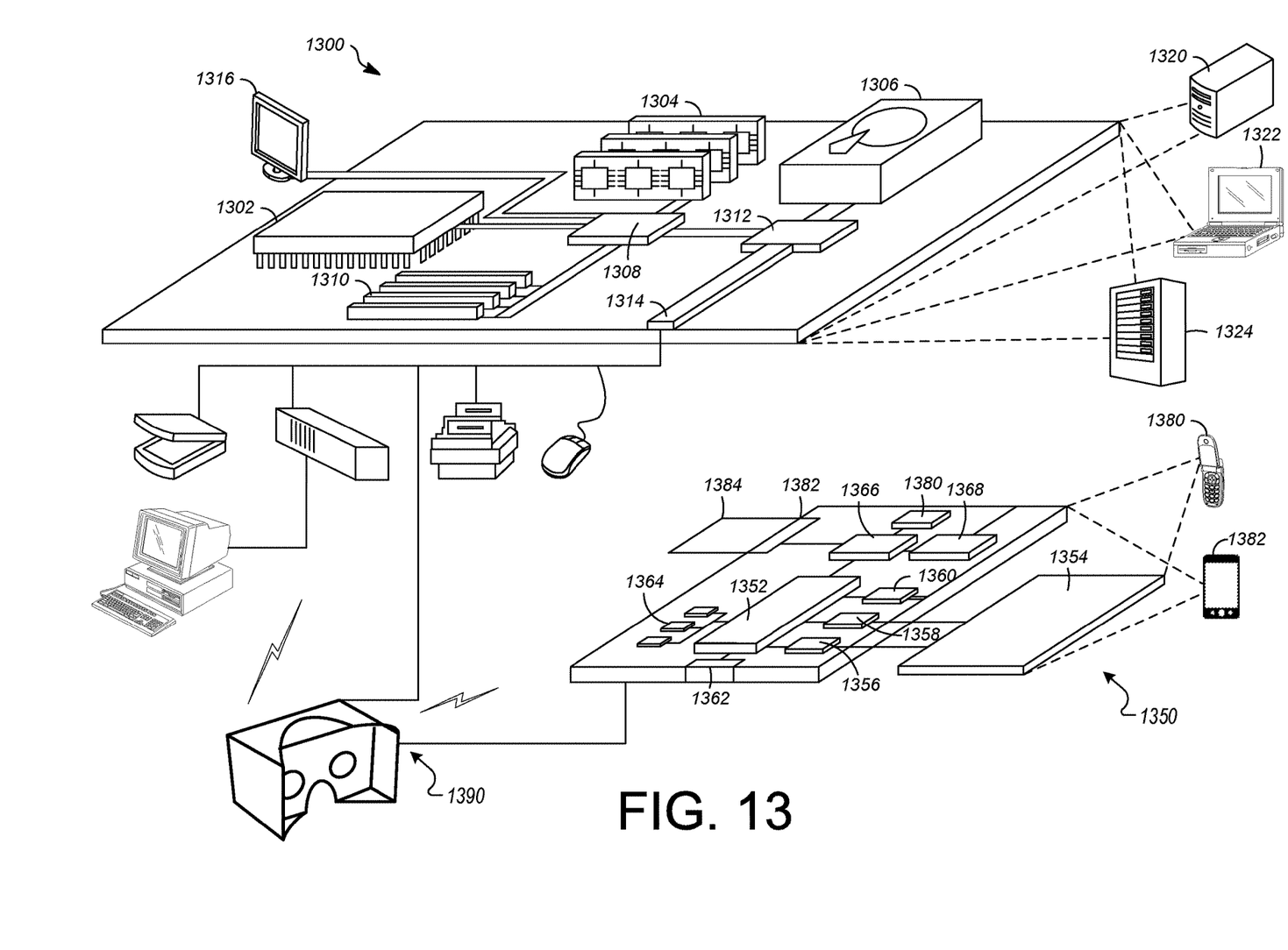
FIG. 13 shows an example of a computer device and a mobile computer device which may be used with the described techniques.

FIG. 13 shows an example of a computer device 1300 and a mobile computer device 1350, which may be used with the described techniques. Computing device 1300 can include a processor 1302, memory 1304, a storage device 1306, a high-speed interface 1308 connecting to memory 1304 and high-speed expansion ports 1310, and a low speed interface 1312 connecting to low speed bus 1314 and storage device 1306. Components 1302, 1304, 1306, 1308, 1310, and 1312, are interconnected using various busses, and can be mounted on a common motherboard or in other manners as appropriate. Processor 1302 can process instructions for execution within the computing device 1300, including instructions stored in the memory 1304 or on storage device 1306 to display graphical information for a GUI on an external input/output device, such as display 1316 coupled to high speed interface 1308. In some embodiments, multiple processors and/or multiple buses can be used, as appropriate, along with multiple memories and types of memory. In addition, multiple computing devices 1300 can be connected, with each device providing portions of the necessary operations (e.g., as a server bank, a group of blade servers, or a multi-processor system).

Memory 1304 stores information within computing device 1300. In one embodiment, memory 1304 is a volatile memory unit or units. In another embodiment, memory 1304 is a non-volatile memory unit or units. Memory 1304 may also be another form of computer-readable medium, such as a magnetic or optical disk.

Storage device 1306 is capable of providing mass storage for the computing device 1300. In one embodiment, storage device 1306 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as memory 1304, storage device 1306, or memory on processor 1302.

High speed controller 1308 manages bandwidth-intensive operations for computing device 1300, while low speed controller 1312 manages lower bandwidth-intensive operations. Such allocation of functions is exemplary only. In one embodiment, high-speed controller 1308 is coupled to memory 1304, display 1316 (e.g., through a graphics processor or accelerator), and to high-speed expansion ports 1310, which may accept various expansion cards (not shown). Low-speed controller 1312 can be coupled to storage device 1306 and low-speed expansion port 1314. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Computing device 1300 can be implemented in a number of different forms, as shown in the figure. For example, it can be implemented as a standard server 1320, or multiple times in a group of such servers. It can also be implemented as part of a rack server system 1324. In addition, it can be implemented in a personal computer such as a laptop computer 1322. Alternatively, components from computing device 1300 can be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes processor 1352, memory 1364, an input/output device such as display 1354, communication interface 1366, and transceiver 1368, among other components. Device 1350 may also be provided with a storage device, such as a microdrive or other device, to provide additional storage. Each of components 1350, 1352, 1364, 1354, 1366, and 1368, are interconnected using various buses, and several of the components may be mounted on a common motherboard or in other manners as appropriate.

Processor 1352 can execute instructions within the computing device 1350, including instructions stored in memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to display 1354. Display 1354 may be, for example, a TFT LCD (Thin-Film-Transistor Liquid Crystal Display) or an OLED (Organic Light Emitting Diode) display, or other appropriate display technology. Display interface 1356 may comprise appropriate circuitry for driving display 1354 to present graphical and other information to a user. Control interface 1358 may receive commands from a user and convert them for submission to processor 1352. In addition, external interface 1362 may communicate with processor 1352, so as to enable near area communication of device 1350 with other devices. External interface 1362 can provide, for example, for wired or wireless communication in some embodiments multiple interfaces can be used.

Memory 1364 stores information within computing device 1350. Memory 1364 can be implemented as one or more of a computer-readable medium or media, a volatile memory unit or units, or a non-volatile memory unit or units. Expansion memory 1384 may also be provided and connected to device 1350 through expansion interface 1382, which may include, for example, a SIMM (Single In Line Memory Module) card interface. Such expansion memory 1384 may provide extra storage space for device 1350, or may also store applications or other information for device 1350. Specifically, expansion memory 1384 may include instructions to carry out or supplement the processes described above, and may include secure information also. Thus, for example, expansion memory 1384 can be a security module for device 1350, and can be programmed with instructions that permit secure use of device 1350. In addition, secure applications may be provided via the SIMM cards, along with additional information, such as placing identifying information on the SIMM card in a non-hackable manner.

The memory can include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 1364, expansion memory 1384, or memory on processor 1352 that may be received, for example, over transceiver 1368 or external interface 1362.

Device 1350 can communicate wirelessly through communication interface 1366, which can include digital signal processing circuitry where necessary. Communication interface 1366 can provide communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 1368. In addition, short-range communication can occur, such as using a Bluetooth, Wi-Fi, or other such transceiver (not shown). In addition, GPS (Global Positioning System) receiver module 1380 can provide additional navigation- and location-related wireless data to device 1350, which can be used as appropriate by applications running on device 1350.

Device 1350 can also communicate audibly using audio codec 1360, which may receive spoken information from a user and convert it to usable digital information. Audio codec 1360 may likewise generate audible sounds for a user, such as through a speaker, e.g., in a handset of device 1350. Such sound can include sound from voice telephone calls, can include recorded sound (e.g., voice messages, music files, etc.) and can also include sound generated by applications operating on device 1350.

Computing device 1350 can be implemented in a number of different forms, as shown in the figure. For example, it can be implemented as cellular telephone 1380. It can also be implemented as part of smart phone 1382, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 13 can include sensors that interface with a virtual reality headset (VR headset/HMD device 1390). For example, one or more sensors included on computing device 1350 or other computing device depicted in FIG. 13, can provide input to VR headset 1390 or in general, provide input to a VR space. The sensors can include, but are not limited to, a touchscreen, accelerometers, gyroscopes, pressure sensors, biometric sensors, temperature sensors, humidity sensors, and ambient light sensors. Computing device 1350 can use the sensors to determine an absolute position and/or a detected rotation of the computing device in the VR space that can then be used as input to the VR space. For example, computing device 1350 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space.

In some embodiments, one or more input devices included on, or connect to, the computing device 1350 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1350 when the computing device is incorporated into the VR space can cause a particular action to occur in the VR space.

In some embodiments, one or more output devices included on the computing device 1350 can provide output and/or feedback to a user of the VR headset 1390 in the VR space. The output and feedback can be visual, tactical, or audio. The output and/or feedback can include, but is not limited to, rendering the VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 1350 can be placed within VR headset 1390 to create a VR system. VR headset 1390 can include one or more positioning elements that allow for the placement of computing device 1350, such as smart phone 1382, in the appropriate position within VR headset 1390. In such embodiments, the display of smart phone 1382 can render stereoscopic images representing the VR space or virtual environment.

In some embodiments, the computing device 1350 may appear as another object in a computer-generated, 3D environment. Interactions by the user with the computing device 1350 (e.g., rotating, shaking, touching a touchscreen, swiping a finger across a touch screen) can be interpreted as interactions with the object in the VR space. As just one example, computing device can be a laser pointer. In such an example, computing device 1350 appears as a virtual laser pointer in the computer-generated, 3D environment. As the user manipulates computing device 1350, the user in the VR space sees movement of the laser pointer. The user receives feedback from interactions with the computing device 1350 in the VR environment on the computing device 1350 or on the VR headset 1390.

In some embodiments, a computing device 1350 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit the disclosed embodiments.

A number of embodiments have been described. Nevertheless, it will be understood that various modifications may be made without departing from the spirit and scope of the specification.

Further implementations are summarized in the following examples:

Example 1

A method comprising: receiving three-dimensional (3D) information captured by a first 3D system, the 3D information including images of an object; determining a surface normal for first image content of the object; and generating modified 3D information by applying first shading to the first image content based on the determined surface normal.

Example 2

The method according to Example 1, wherein applying the first shading comprises determining a dot product between the surface normal and a camera vector, and selecting the first shading based on the determined dot product.

Example 3

The method according to Example 1 or 2, wherein applying the first shading comprises fading the first image content to black based on the first image content facing away in the images.

Example 4

The method according to any preceding Example, further comprising identifying a hole in at least one of the images, wherein generating the modified 3D information comprises applying second shading to the hole.

Example 5

The method according to any preceding Example, wherein generating the modified 3D information further comprises hiding a depth error in the 3D information.

Example 6

The method according to Example 5, wherein the depth data is based on infrared (IR) signals returned from the scene, and wherein generating the modified 3D information comprises applying second shading proportional to a strength of the IR signals.

Example 7

The method according to any preceding Example, further comprising stereoscopically presenting the modified 3D information at the second 3D system, wherein the first image content has the first shading.

Example 8

The method according to Example 7, wherein stereoscopically presenting the modified 3D information comprises additively rendering the images.

Example 9

The method according to any preceding Example, further comprising identifying, using the depth data, second image content in the images associated with a depth value that satisfies a criterion, wherein generating modified 3D information further comprises applying second shading to the identified second image content.

Example 10

The method according to Example 9, wherein the criterion includes that the second image content is beyond a predefined depth in the scene.

Example 11

The method according to Example 10, wherein applying the second shading comprises causing the second image content to be rendered as black.

Example 12

The method according to Example 11, wherein use of the predefined depth, and applying the second shading, comprises causing a background of the images to be rendered as black.

Example 13

The method according to any of Examples 9 to 12, wherein the second shading is dependent on a depth value of the second image content.

Example 14

The method according to any of Examples 9 to 13, wherein the criterion includes that the second image content is closer than a predefined depth in the scene.

Example 15

The method according to any preceding Example, wherein a first portion of the object has a greater depth value in depth data of the 3D information than a second portion of the object, and wherein generating the modified 3D information further comprises applying second shading to a portion of the images where second image content corresponding to the second portion is located.

Example 16

The method according to Example 15, wherein applying the second shading comprises selecting the portion of the images based on a portion of a display for presentation of the images.

Example 17

The method according to Example 16, wherein the object comprises a person, the first portion of the object comprises a face of the person, the second portion of the object comprises a torso of the person, and the portion of the display comprises a bottom of the display.

Example 18

The method according to any preceding Example, further comprising providing the modified 3D information to a second 3D system.

Example 19

A system comprising: cameras; a depth sensor; and a three-dimensional (3D) content module having a processor executing instructions stored in a memory, the memory having stored therein 3D information including images and depth data of a scene, the images including an object, the instructions causing the processor to determine a surface normal for first image content of the object, and to generate modified 3D information by applying first shading to the first image content based on the determined surface normal.

Example 20

The system according to Example 19, wherein the instructions further cause the processor to identify, using the depth data, second image content as being associated with a depth value that satisfies a criterion, and to apply second shading to the identified second image content in generating the modified 3D information.

Example 21

The system according to Example 19 or 20, wherein a first portion of the object has a greater depth value than a second portion of the object, and wherein generating the modified 3D information further comprises applying second shading to a portion of the images where second image content corresponding to the second portion is located.

Example 22

A method comprising: receiving three-dimensional (3D) information captured by a first 3D system, the 3D information including images of an object and depth data about the object, wherein a first portion of the object has a lesser depth value than a second portion of the object; and generating modified 3D information by applying first shading to a portion of the images where first image content corresponding to the first portion is located.

Example 23

The method according to Example 22, wherein the images include the object in a scene, and wherein generating the modified 3D information further comprises determining a surface normal for second image content of the object, and applying second shading to the second image content based on the determined surface normal.

Example 24

The method according to Example 23, wherein applying the second shading comprises determining a dot product between the surface normal and a camera vector, and selecting the second shading based on the determined dot product.

Example 25

The method according to Example 23 or 24, wherein applying the second shading comprises fading the second image content to black based on the second image content facing away in the images.

Example 26

The method according to any of Examples 22 to 25, further comprising identifying a hole in at least one of the images, wherein generating the modified 3D information comprises applying second shading to the hole.

Example 27

The method according to any of Examples 22 to 26, wherein generating the modified 3D information further comprises hiding a depth error in the 3D information.

Example 28

The method according to Example 27, wherein the depth data is based on infrared (IR) signals returned from the scene, and wherein generating the modified 3D information comprises applying second shading proportional to a strength of the IR signals.

Example 29

The method according to any of Examples 22 to 28, further comprising stereoscopically presenting the modified 3D information at the second 3D system, wherein the first image content has the first shading.

Example 30

The method according to Example 29, wherein stereoscopically presenting the modified 3D information comprises additively rendering the images.

Example 31

The method according to any of Examples 22 to 30, further comprising identifying, using the depth data, second image content as being associated with a depth value that satisfies a criterion, and applying second shading to the identified second image content in generating the modified 3D information

Example 32

The method according to Example 31, wherein the criterion includes that the first image content is beyond a predefined depth in the scene.

Example 33

The method according to Example 32, wherein applying the first shading comprises causing the first image content to be rendered as black.

Example 34

The method according to Example 33, wherein use of the predefined depth, and applying the first shading, comprises causing a background of the images to be rendered as black.

Example 35

The method according to any of Examples 31 to 34, wherein the first shading is dependent on a depth value of the first image content.

Example 36

The method according to any of Examples 31 to 35, wherein the criterion includes that the first image content is closer than a predefined depth in the scene.

Example 37

The method according to any of Examples 22 to 36, further comprising providing the modified 3D information to a second 3D system.

Example 38

A system comprising: cameras; a depth sensor; and a three-dimensional (3D) content module having a processor executing instructions stored in a memory, the memory having stored therein 3D information including images and depth data of a scene, the images including an object, wherein a first portion of the object has a greater depth value than a second portion of the object, the instructions causing the processor to generate modified 3D information by applying first shading to a portion of the images where first image content corresponding to the first portion is located.

Example 39

The system according to Example 38, wherein the instructions further cause the processor to determine a surface normal for second image content of the object, and wherein generating the modified 3D information includes applying second shading to the second image content based on the determined surface normal.

Example 40

The system according to Example 38 or 39, the instructions causing the processor to identify, using the depth data, second image content as being associated with a depth value that satisfies a criterion, and to apply second shading to the identified second image content in generating the modified 3D information.

What is claimed is:
1. A method comprising:
receiving three-dimensional (3D) information generated by a first 3D system, the 3D information including images of a scene and depth data about the scene, the images generated by cameras capturing respective views of the scene;
identifying, using the depth data, first image content in the images associated with a depth value that satisfies a criterion;
generating modified 3D information by applying first shading at the identified first image content, the first shading including changing a first parameter that defines an appearance of the first image content;
making, using the modified 3D information, a 3D presentation that includes at least a portion of the respective views of the scene; and
identifying a hole in at least one of the images, wherein generating the modified 3D information comprises applying second shading at the hole, the second shading including adding a second parameter at a location of the hole.

2. The method of claim 1, wherein the criterion includes that the first image content is beyond a predefined depth in the scene.

3. The method of claim 2, wherein applying the first shading comprises causing the first image content to be rendered as black.

4. The method of claim 3, wherein use of the predefined depth, and applying the first shading, comprises causing a background of the images to be rendered as black.

5. The method of claim 1, wherein the first shading is dependent on the depth value of the first image content.

6. The method of claim 1, wherein the criterion includes that the first image content is closer than a predefined depth in the scene.

7. The method of claim 1, wherein the scene contains an object in the images, and wherein generating the modified 3D information further comprises determining a surface normal for second image content of the object, and applying the second shading at the second image content based on the determined surface normal.

8. The method of claim 7, wherein applying the second shading comprises determining a dot product between the surface normal and a camera vector, and selecting the second shading based on the determined dot product.

9. The method of claim 7, wherein applying the second shading comprises fading the second image content to black based on the second image content facing away in the images.

10. The method of claim 1, wherein generating the modified 3D information further comprises hiding a depth error in the 3D information.

11. The method of claim 10, wherein the depth data is based on infrared (IR) signals returned from the scene, and wherein generating the modified 3D information comprises applying the second shading proportional to a strength of the IR signals.

12. The method of claim 1, further comprising providing the modified 3D information to a second 3D system.

13. The method of claim 12, further comprising stereoscopically presenting the modified 3D information at the second 3D system, wherein the first image content has the first shading.

14. The method of claim 13, wherein stereoscopically presenting the modified 3D information comprises additively rendering the images.

15. A method comprising:
receiving three-dimensional (3D) information generated by a first 3D system, the 3D information including images of a scene and depth data about the scene, the images generated by cameras capturing respective views of the scene;
identifying, using the depth data, first image content in the images associated with a depth value that satisfies a criterion;
generating modified 3D information by applying first shading at the identified first image content, the first shading including changing a parameter that defines an appearance of the first image content; and
making, using the modified 3D information, a 3D presentation that includes at least a portion of the respective views of the scene;
wherein the scene contains an object in the images and a first portion of the object has a greater depth value in the depth data than a second portion of the object, and wherein generating the modified 3D information further comprises applying second shading at a portion of the images where second image content corresponding to the second portion is located.

16. The method of claim 15, wherein applying the second shading comprises selecting the portion of the images based on a portion of a display for presentation of the images.

17. The method of claim 16, wherein the object comprises a person, the first portion of the object comprises a face of the person, the second portion of the object comprises a torso of the person, and the portion of the display comprises a bottom of the display.

18. The method of claim 15, further comprising identifying a hole in at least one of the images, wherein generating the modified 3D information comprises applying third shading at the hole.

19. A system comprising:
cameras;
a depth sensor; and
a three-dimensional (3D) content module having a processor executing instructions stored in a memory, the instructions causing the processor to: (i) identify, using depth data included in 3D information, first image content in images of a scene included in the 3D information, the images generated by the cameras capturing respective views of the scene, the first image content identified as being associated with a depth value that satisfies a criterion, (ii) generate modified 3D information by applying first shading at the identified first image content, the first shading including changing a first parameter that defines an appearance of the first image content, (iii) identify a hole in at least one of the images, wherein generating the modified 3D information comprises applying second shading at the hole, the second shading including adding a second parameter at a location of the hole, and (iv) make, using the modified 3D information, a 3D presentation that includes at least a portion of the respective views of the scene.

20. The system of claim 19, wherein the scene contains an object in the images, and wherein generating the modified 3D information further comprises determining a surface normal for second image content of the object, and applying the second shading at the second image content based on the determined surface normal.

21. The system of claim 19, wherein the scene contains an object in the images and a first portion of the object has a greater depth value than a second portion of the object, and wherein generating the modified 3D information further comprises applying the second shading at a portion of the images where second image content corresponding to the second portion is located.

* * * * *